(12) United States Patent
Power et al.

(10) Patent No.: US 9,568,009 B2
(45) Date of Patent: Feb. 14, 2017

(54) GAS TURBINE ENGINE FLOW PATH GEOMETRY

(71) Applicant: Rolls-Royce Corporation, Indianapolis, IN (US)

(72) Inventors: Bronwyn Power, Brownsburg, IN (US); Roy D. Fulayter, Avon, IN (US); Jonathan M. Rivers, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 613 days.

(21) Appl. No.: 14/092,356

(22) Filed: Nov. 27, 2013

(65) Prior Publication Data

US 2015/0128604 A1    May 14, 2015

Related U.S. Application Data

(60) Provisional application No. 61/776,752, filed on Mar. 11, 2013.

(51) Int. Cl.
*F04D 19/02*     (2006.01)
*F01D 5/14*      (2006.01)
(Continued)

(52) U.S. Cl.
CPC .......... *F04D 19/028* (2013.01); *F01D 5/143* (2013.01); *F01D 5/20* (2013.01); *F02C 3/00* (2013.01);
(Continued)

(58) Field of Classification Search
CPC ............ F01D 5/20; F01D 5/143; F01D 25/24; F04D 19/028
See application file for complete search history.

(56) References Cited

U.S. PATENT DOCUMENTS

| 2,788,172 A | 4/1957 | Stalker |
| 2,830,753 A | 4/1958 | Stalker |

(Continued)

FOREIGN PATENT DOCUMENTS

| EP | 492865 A1 | 7/1992 |
| EP | 801230 A2 | 10/1997 |

(Continued)

OTHER PUBLICATIONS

PCT International Search Report and Written Opinion completed by the ISA/EP on Sep. 30, 2014 and issued in connection with PCT/US2013/072315.

*Primary Examiner* — Eric Keasel
*Assistant Examiner* — Cameron Corday
(74) *Attorney, Agent, or Firm* — Barnes & Thornburg LLP

(57) ABSTRACT

A flow path surface of a gas turbine engine at the location of a bladed component is disclosed in which the flow path surface includes a cylindrical upstream side and a conical downstream side. The bladed component is located at the intersection of the cylindrical upstream side and the conical downstream side. The cylindrical upstream side can extend from a leading edge of the bladed component, or a point upstream of it, to a location between the leading edge and trailing edge of the component. The conical downstream side can extend past the trailing edge of the bladed component. The bladed component can be a fan blade or a compressor blade.

17 Claims, 3 Drawing Sheets

(51) Int. Cl.
*F01D 5/20* (2006.01)
*F02C 3/00* (2006.01)
*F02C 9/16* (2006.01)

(52) U.S. Cl.
CPC ........... *F02C 9/16* (2013.01); *F05D 2250/231* (2013.01); *F05D 2250/232* (2013.01); *F05D 2250/293* (2013.01); *F05D 2250/70* (2013.01); *Y02T 50/673* (2013.01)

(56) References Cited

U.S. PATENT DOCUMENTS

| | | | |
|---|---|---|---|
| 3,173,605 A | 3/1965 | Harris |
| 3,295,824 A | 1/1967 | Woodwell et al. |
| 3,825,364 A | 7/1974 | Halila et al. |
| 3,851,994 A | 12/1974 | Seippel |
| 3,869,222 A | 3/1975 | Rahnke et al. |
| 4,008,978 A | 2/1977 | Smale |
| 4,213,736 A | 7/1980 | Gongwer |
| 4,358,246 A | 11/1982 | Hanson et al. |
| 4,398,866 A | 8/1983 | Hartel et al. |
| 4,439,981 A | 4/1984 | Weiler et al. |
| 4,522,557 A | 6/1985 | Bouiller et al. |
| 4,639,194 A | 1/1987 | Bell, III et al. |
| 4,643,638 A | 2/1987 | Laurello |
| 4,679,981 A | 7/1987 | Guibert et al. |
| 4,684,320 A | 8/1987 | Kunz |
| 4,726,737 A | 2/1988 | Weingold et al. |
| 4,759,687 A | 7/1988 | Miraucourt et al. |
| 4,971,520 A | 11/1990 | Van Houten |
| 5,080,557 A | 1/1992 | Berger |
| 5,167,487 A | 12/1992 | Rock |
| 5,167,489 A | 12/1992 | Wadia et al. |
| 5,169,287 A | 12/1992 | Proctor et al. |
| 5,169,288 A | 12/1992 | Gliebe et al. |
| 5,181,826 A | 1/1993 | Rock |
| 5,273,400 A | 12/1993 | Amr |
| 5,333,992 A | 8/1994 | Kane et al. |
| 5,368,095 A | 11/1994 | Kadambi et al. |
| 5,385,447 A | 1/1995 | Geister |
| 5,439,348 A | 8/1995 | Hughes et al. |
| 5,478,199 A | 12/1995 | Gliebe |
| 5,486,090 A | 1/1996 | Thompson et al. |
| 5,513,952 A * | 5/1996 | Mizuta ................... F01D 5/143 415/182.1 |
| 5,562,408 A | 10/1996 | Proctor et al. |
| 5,584,660 A | 12/1996 | Carter et al. |
| 5,642,985 A | 7/1997 | Spear et al. |
| 5,735,673 A | 4/1998 | Matheny et al. |
| 5,769,607 A | 6/1998 | Neely et al. |
| 5,810,555 A | 9/1998 | Savage et al. |
| 5,906,179 A | 5/1999 | Capdevila |
| 6,048,174 A | 4/2000 | Samit et al. |
| 6,059,532 A | 5/2000 | Chen et al. |
| 6,071,077 A | 6/2000 | Rowlands |
| 6,139,257 A | 10/2000 | Proctor et al. |
| 6,250,883 B1 | 6/2001 | Robinson et al. |
| 6,315,521 B1 | 11/2001 | Hunt |
| 6,328,533 B1 | 12/2001 | Decker et al. |
| 6,338,609 B1 | 1/2002 | Decker et al. |
| 6,338,611 B1 | 1/2002 | Anderson et al. |
| 6,340,285 B1 | 1/2002 | Gonyou et al. |
| 6,354,795 B1 | 3/2002 | White et al. |
| 6,368,054 B1 | 4/2002 | Lucas |
| 6,368,061 B1 | 4/2002 | Capdevila |
| 6,386,830 B1 | 5/2002 | Slipper et al. |
| 6,471,474 B1 | 10/2002 | Mielke et al. |
| 6,499,940 B2 | 12/2002 | Adams |
| 6,508,630 B2 | 1/2003 | Liu et al. |
| 6,524,070 B1 | 2/2003 | Carter |
| RE38,040 E | 3/2003 | Spear et al. |
| 6,561,760 B2 | 5/2003 | Wadia et al. |
| 6,561,761 B1 | 5/2003 | Decker et al. |
| 6,562,227 B2 | 5/2003 | Lamphere et al. |
| 6,659,716 B1 | 12/2003 | Laurello et al. |
| 6,733,233 B2 | 5/2004 | Jasklowski et al. |
| 6,942,445 B2 | 9/2005 | Morris et al. |
| 6,991,428 B2 | 1/2006 | Crane |
| 7,004,722 B2 * | 2/2006 | Teramura ................ F01D 5/143 415/119 |
| 7,004,922 B1 | 2/2006 | Shesol |
| 7,008,183 B2 | 3/2006 | Sayegh et al. |
| 7,033,138 B2 | 4/2006 | Tomita et al. |
| 7,134,842 B2 | 11/2006 | Tam et al. |
| 7,195,456 B2 | 3/2007 | Aggarwala et al. |
| 7,217,096 B2 | 5/2007 | Lee |
| 7,220,100 B2 | 5/2007 | Lee et al. |
| 7,249,933 B2 | 7/2007 | Lee et al. |
| 7,290,982 B2 | 11/2007 | Girard et al. |
| 7,351,039 B2 | 4/2008 | Bachofner et al. |
| 7,374,403 B2 | 5/2008 | Decker et al. |
| 7,476,086 B2 | 1/2009 | Wadia et al. |
| 7,487,819 B2 | 2/2009 | Wang et al. |
| 7,624,787 B2 | 12/2009 | Lee et al. |
| 7,690,890 B2 | 4/2010 | Aotsuka et al. |
| 7,811,053 B2 | 10/2010 | Balamucki et al. |
| 7,938,168 B2 | 5/2011 | Lee et al. |
| 7,972,109 B2 | 7/2011 | Crall et al. |
| 7,997,872 B2 | 8/2011 | Wilson |
| 8,061,980 B2 | 11/2011 | Praisner et al. |
| 8,092,160 B2 | 1/2012 | Shi et al. |
| 8,157,518 B2 | 4/2012 | Decker et al. |
| 8,337,154 B2 | 12/2012 | Decker et al. |
| 8,393,872 B2 | 3/2013 | Kirtley |
| 8,413,709 B2 | 4/2013 | Lee et al. |
| 8,647,054 B2 | 2/2014 | Aulich et al. |
| 2001/0021343 A1 | 9/2001 | Kuwabara et al. |
| 2005/0232752 A1 | 10/2005 | Meisels |
| 2011/0189020 A1 | 8/2011 | Aulich et al. |
| 2011/0255985 A1 | 10/2011 | Diamond et al. |
| 2011/0293430 A1 | 12/2011 | Jan |
| 2012/0027604 A1 | 2/2012 | McDonald et al. |
| 2013/0156559 A1 * | 6/2013 | Perrot .................... F01D 5/143 415/185 |

FOREIGN PATENT DOCUMENTS

| | | |
|---|---|---|
| EP | 1245791 A2 | 10/2002 |
| EP | 1516322 A2 | 3/2005 |
| GB | 2407344 A | 4/2005 |
| GB | 2431697 A | 5/2007 |
| WO | 2011/157927 A1 | 12/2011 |
| WO | 2012025357 A1 | 3/2012 |
| WO | 2013141935 A1 | 9/2013 |

* cited by examiner

GAS TURBINE ENGINE FLOW PATH GEOMETRY

CROSS REFERENCE TO RELATED APPLICATIONS

This application claims priority to and the benefit of U.S. Provisional Patent Application No. 61/776,752, filed 11 Mar. 2013, the disclosure of which is now expressly incorporated herein by reference.

TECHNICAL FIELD

The present invention generally relates to gas turbine engine flow paths, and more particularly, but not exclusively, to gas turbine engine flow path geometry.

BACKGROUND

Providing flow paths through a gas turbine engine that have acceptable performance characteristics remains an area of interest. Some existing systems have various shortcomings relative to certain applications. Accordingly, there remains a need for further contributions in this area of technology.

SUMMARY

One embodiment of the present invention is a unique gas turbine engine flow path surface. Other embodiments include apparatuses, systems, devices, hardware, methods, and combinations for directing the flow through a turbomachinery component in the vicinity of a blade. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
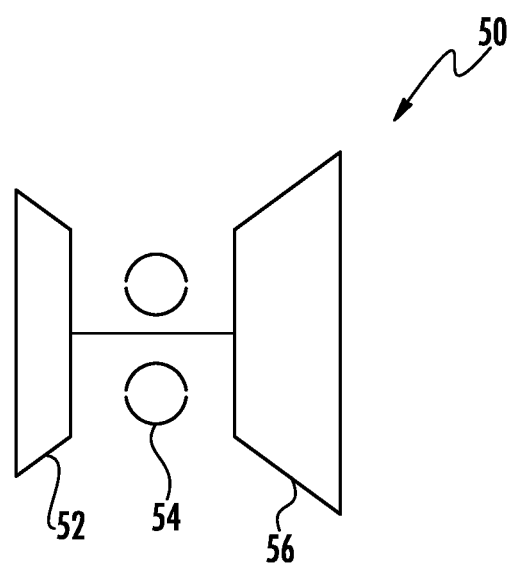
FIG. 1 depicts an embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one embodiment of a gas turbine engine 50 is shown having turbomachinery components 52 and 56 as well as a combustor 54. During operation, a working fluid such as air is received by the gas turbine engine 50 and is compressed and mixed with a fuel prior to being combusted and expanded to produce work. The gas turbine engine 50 can be configured as an adaptive and/or variable cycle engine and can take any variety of forms in other embodiments such as a turboshaft, turbofan, or turboprop, or turbojet. Thus, the gas turbine engine 50 can be a single spool engine as is depicted in FIG. 1, but in other embodiments the gas turbine engine 50 can include additional spools.

The turbomachinery component 52 depicted in FIG. 1 is in the form of a compressor, and although the turbomachinery component 52 is shown as a single component, in some forms the gas turbine engine 50 can include multiple turbomachinery components 52. For example, in one non-limiting embodiment the gas turbine engine 50 can include a turbomachinery component 52 in the form of a fan as well as a turbomachinery component 52 in the form of a compressor stage. The fan can be a single or multi stage fan, and the compressor stage can be a single or multi stage compressor. In some forms the fan stage can be driven by a low pressure spool and the compressor stage can be driven by a higher pressure spool, among any variety of other possibilities. No limitation of the gas turbine engine 50 is hereby intended given the schematic representation illustrated in FIG. 1. As will be appreciated, the turbomachinery component 52 can include a plurality of rotating blades and in some forms can include a plurality of stator vanes. In some forms the turbomachinery component 52 can include multiple rows of blades and/or multiple rows and stator vanes. The stator vanes can be static and/or variable.

The gas turbine engine 50 can be used to provide power to an aircraft (not illustrated). As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2:
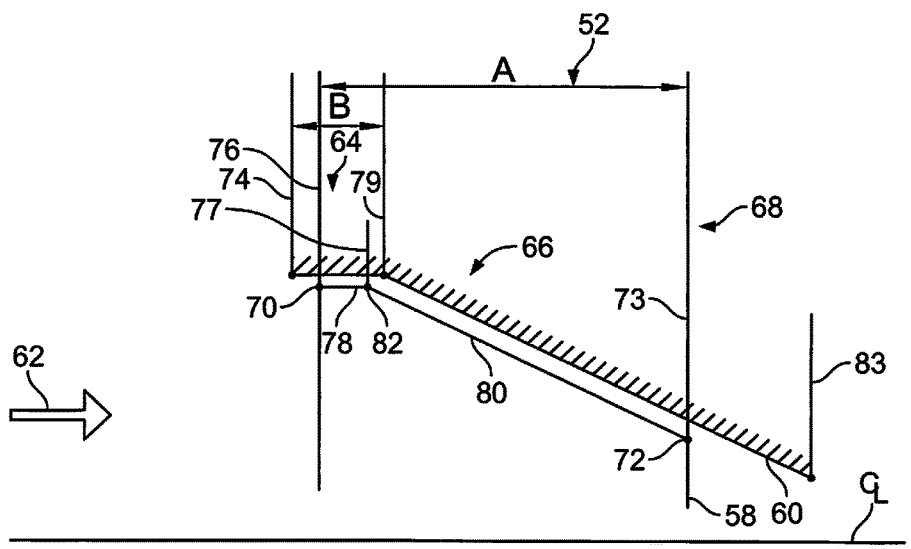
FIG. 2 depicts an embodiment of an outer wall and component of a gas turbine engine.

Turning now to FIG. 2, one embodiment is depicted of the turbomachinery component 52 having a blade 58 that rotates about the centerline and an outer wall 60 disposed radially outward of the blade 58. As will be understood given the discussion above, the blade 58 can be either a compressor blade or a fan blade. The outer wall 60 is used to form a flow path for the working fluid 62 that passes through the turbomachinery component 52. The outer wall 60 can take the form of a structural component of the gas turbine engine 50, for example in some applications the structure component is a casing of the gas turbine engine 50. In other forms the outer wall 60 can be a component used to form a flow path surface that is attached to a structural component of the gas turbine engine 50, or intermediate load transferring component of the gas turbine engine 50. For example, a component used to create a flow path surface can take the form of a liner that is attached to and offset from a casing of the gas turbine engine 50. In some applications the liner can be a fan liner, they casing can be a fan casing or compressor casing, etc. In short, the outer wall 60 can take a variety of forms.

The outer wall 60 generally includes a cylindrical upstream portion 64, a transition 66, and a conical downstream portion 68. The union of these two geometric shapes across the axial tip of the blade 58 provides at transonic flow conditions an increase in total blade area within the blade passage before the passage shock relative to a purely cone-shaped casing. This configuration provides two approximate design options: either actual flow within the blade passage is increased relative to a conventional configuration, or optionally the blade baseline airflow can be maintained via blade closure, leading to a reduction in specific flow due to the increase in blade passage area before the passage shock for the same actual flow. If, in conjunction with the casing, the baseline blade flow is maintained as per the second design approach, then due to the reduction in effective specific-flow the blade typically exhibits an improvement in efficiency at operating points such as cruise and take-off. The baseline flow rate can be maintained by increasing the stagger-angle parameter of either all or a subset of the blade airfoil sections or by reducing the camber of either all or a subset of the blade airfoil sections. In one embodiment, a baseline blade flow rate is maintained by increasing the blade tip stagger-angle and linearly blending the change in stagger-angle to zero at the blade hub.

The cylindrical upstream portion 64 can start at any axial location forward of a leading edge 70 of the blade 58 and generally extends aft to the transition 66 which is located between the leading edge 70 and a trailing edge 72 of the blade 58. In the illustrated embodiment the cylindrical upstream portion 64 starts at location 74 which is forward of location 76 associated with the leading edge 70 of the blade 58. In other embodiments the cylindrical upstream portion 64 starts at the axial location of the leading edge 70, thus location 74 and location 76 are axially coincident. In one alternative and/or additional embodiment, the axial extent of the cylindrical upstream portion 64, shown as distance B in FIG. 2, is approximately ¼ of the distance between location 76 and location 73 associated with the trailing edge 72 of the blade 58, shown as distance A in FIG. 2.

As used herein the term "cylindrical" includes surfaces that have a constant radius relative to a reference axis along the entirety of the circumference and the entirety of the axial reach of the cylindrical surface. The term also includes surfaces that are substantially cylindrical, either partially or in whole, around the circumference and axial reach of the cylinder. Non-limiting examples of substantially cylindrical include surfaces that have some amount of variation introduced through design, manufacturing, wear, etc.

The outer wall 60 changes from the cylindrical upstream portion 64 to the conical downstream portion 68 through the transition 66 which is denoted for convenience as location 79. The transition 66 can be formed as the result of a manufacturing operation such as, for example, milling, casting, molding, etc. The transition 66 could also represent a joint between separately constructed components fastened to reside next to one another to form the cylindrical upstream portion 64 and conical downstream portion 68. Thus, the outer wall 60 can be one integral structure or can be an integrated assembly.

The transition 66 between the cylindrical upstream portion 64 and the conical portion can have any shape and can be as abrupt as desired which may take into account manufacturing considerations/tolerances, flow phenomena considerations, etc. Setting forth just a few non-limiting forms, the transition can be a sharp corner in some applications, it can include a smoothed corner, such as a rounded or filleted corner, in other applications, etc. A rounded transition can, but need not, be at a constant radius and/or be centered about a point at which the cylindrical surface meets the conical surface. Other arrangements are also contemplated, such as, but not limited to, a rounded transition that extends further in either the forward or aft direction relative to the other direction.

As the flow path changes from cylindrical to conical it transitions from a surface having very little, if any, contraction, to a surface having a constant contraction once established on the conical surface. Throughout the transition 66, however, the contraction rate can be variable. As will therefore be appreciated, the flow path surface of the outer wall 60 experiences a rate of contraction that varies and will increase or stay the same over the entire axial length of the structure. In the particular form of a rounded corner at the transition 66, the initial contraction rate is relatively low and once a transition to the conical surface is complete the contraction rate is at its highest.

The blade 58 in the illustrated embodiment includes a tip shape that follows the contour of the outer wall 60. Thus, the blade 58 includes a forward portion 78 and an aft portion 80 that mimic the slopes of the cutaway view of the outer wall 60. Not all embodiments need include forward portions 78 and/or aft portions 80 that precisely mimic the slopes of the outer wall 60. An offset of the blade 58 from the outer wall 60 over the forward portion 78 can be constant, as can be an offset of the blade 58 from the outer wall 60 over the aft portion 80. Furthermore, the offset over the forward portion 78 can, but need not, be the same as the offset over the aft portion 80.

A blade transition 82 between the forward portion 78 and aft portion 80 can be placed at location 77 such that it is located axially forward, axially aft, or with any portion of the transition 66. In the illustrated embodiment the location 77 of the blade transition 82 is located forward of the location 79 of transition 66. In one non-limiting embodiment, the axis of the first torsion mode of the blade 58 is located with the transition 66.

The conical downstream portion 68 begins after the transition 66 and generally extends aft past the trailing edge 72 of the blade 58 to location 83 in the illustrated embodiment. In one form the conical downstream portion 68 extends a fraction of the axial chord-length of the blade 58 past the location 73. As used herein the term "conical" includes frustoconical surfaces that have a linear sloping surface around the entirety of the circumference and the entirety of the axial reach of the frustoconical surface. The term also includes surfaces that are substantially linearly sloping, either partially or in whole, around the circumference and axial reach of the surface. Non-limiting examples of substantially frustoconical include surfaces that have some amount of variation in the sloping surface introduced through design, manufacturing, wear, etc. In one non-limiting embodiment, the slope of the linear sloping surface is about nine degrees as measured relative to a reference line, such as the centerline of the engine.

Figure 3:
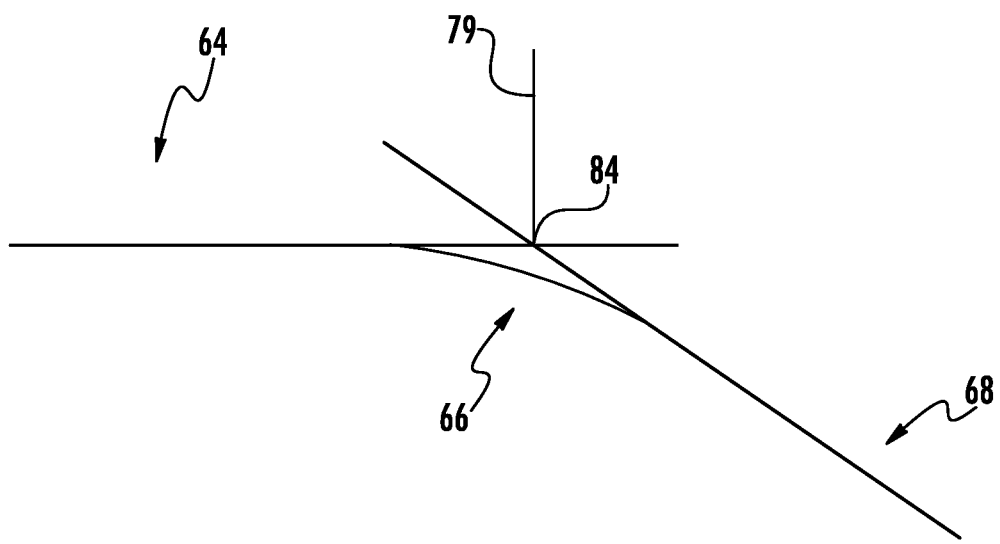
FIG. 3 depicts an embodiment of an intersection between an upstream side and downstream side of an outer wall.

Turning now to FIG. 3, one embodiment of a joint between the cylindrical upstream portion 64 and the conical downstream portion 68 is shown. The transition 66 is illustrated as a rounded corner that extends forward and aft of the location 79 of the transition 66. An intersection 84 is illustrated and represents a location at which the cylindrical upstream portion 64, if continued past the transition 66, would intersect the conical downstream portion 68 if it continued forward of the transition 66. Thus, the intersection of the upstream portion 64 and downstream portion 68 is offset from a flow surface of the transition 66. The offset can be any distance depending on the nature of the transition 66. In some forms the intersection may not be offset. For example, in the case of an integrated outer wall 60 constructed of separate upstream portion 64 and downstream portion 68, the intersection 84 can be at the flow path surface.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
a gas turbine engine flow path structure structured for use to define a flow path in a turbomachinery component, the flow path structure having a flow surface that extends along an upstream portion and a downstream portion and where the upstream portion and the downstream portion are coincident with a bladed turbomachinery component such that the upstream portion and the downstream portion are immediately radially outside of the bladed turbomachinery component, the upstream portion having a cylindrical shape that extends aft from a first axial location to a second axial location, the downstream portion having a conical shape with linear slope extending from the second axial location to a third axial location such as to form a flat cone, the conical shape having a larger radius at the second axial location than a radius at the third axial location, wherein the second axial location is coincident with a vibratory modal axis of the bladed turbomachinery component.

2. The apparatus of claim 1, wherein the flow surface includes a rounded surface that extends forward and aft of the second axial location such that the second axial location is offset from the flow surface, and wherein the third axial location is aft of a trailing edge of the bladed turbomachinery component.

3. The apparatus of claim 2, wherein the rounded surface includes a constant radius that blends the upstream portion with the downstream portion, and wherein the second axial location is at about ¼ the distance from an axial location of a leading edge of the bladed turbomachinery component to the trailing edge.

4. The apparatus of claim 1, wherein the first axial location is upstream of a leading edge of the bladed turbomachinery component.

5. The apparatus of claim 1, wherein the gas turbine engine flow path structure is a fan track liner.

6. The apparatus of claim 1, wherein the gas turbine engine flow path structure is a casing.

7. The apparatus of claim 1, wherein the upstream portion of the gas turbine engine flow path structure is integral with the downstream portion.

8. An apparatus comprising:
a gas turbine engine structure configured to provide a flow path surface for a compression member of a gas turbine engine, the gas turbine engine structure having a cylindrical upstream portion that axially coincides with an upstream portion of the compression member and a conical downstream portion that axially coincides with a downstream portion of the compression member, and the conical downstream portion having a conical surface of linearly decreasing radius that forms a cone with a straight manufactured surface, wherein an axis of a first torsion mode of the compression member is at a joint between the cylindrical upstream portion and the conical downstream portion.

9. The apparatus of claim 8, wherein the conical downstream portion extends to a location axially aft of a trailing edge of the compression member, and wherein a curved surface portion extends forward and aft of an intersection between the cylindrical upstream portion and a conical downstream portion.

10. The apparatus of claim 9, wherein the compression member is one of a compressor blade and a fan blade, and wherein the cylindrical upstream portion extends forward of the compression member when installed.

11. The apparatus of claim 8, wherein the conical downstream portion extends from an intersection with the cylindrical upstream portion to a point downstream of a trailing edge of the compression member.

12. The apparatus of claim 8, wherein a joint between the cylindrical upstream portion and the conical downstream portion is at a location that is ¼ of the axial distance from a leading edge of the compression member to a trailing edge of the compression member.

13. The apparatus of claim 8, wherein the gas turbine engine structure is further incorporated into a gas turbine engine.

14. The apparatus of claim 8, wherein the gas turbine engine structure is one of a fan track liner and a casing.

15. The apparatus of claim 8, wherein the cylindrical upstream portion is integral with the conical downstream portion.

16. A method comprising:
flowing a working fluid along a cylindrical shaped outer flow path surface that bounds a turbomachinery blade structured to increase a pressure of the working fluid, wherein the cylindrical shaped outer flow path surface is axially coincident with an upstream portion of the turbomachinery blade, and wherein the cylindrical shaped outer flow path surface is part of a fan liner, and which further includes exiting the turbomachinery blade to vibrate about a modal axis located at the transition;
encountering a transition at a downstream end of the cylindrical shaped outer flow path surface; and
turning the working fluid to flow along a conical shaped outer flow path surface having a linear contraction rate that is located downstream of the transition, wherein the conical shaped outer flow path surface is axially coincident with a downstream portion of the turbomachinery blade.

17. The apparatus of claim 16, which further includes combusting a fuel within a combustor of a gas turbine engine, and wherein the flowing occurs along a casing of the gas turbine engine.

* * * * *